Figure 5:
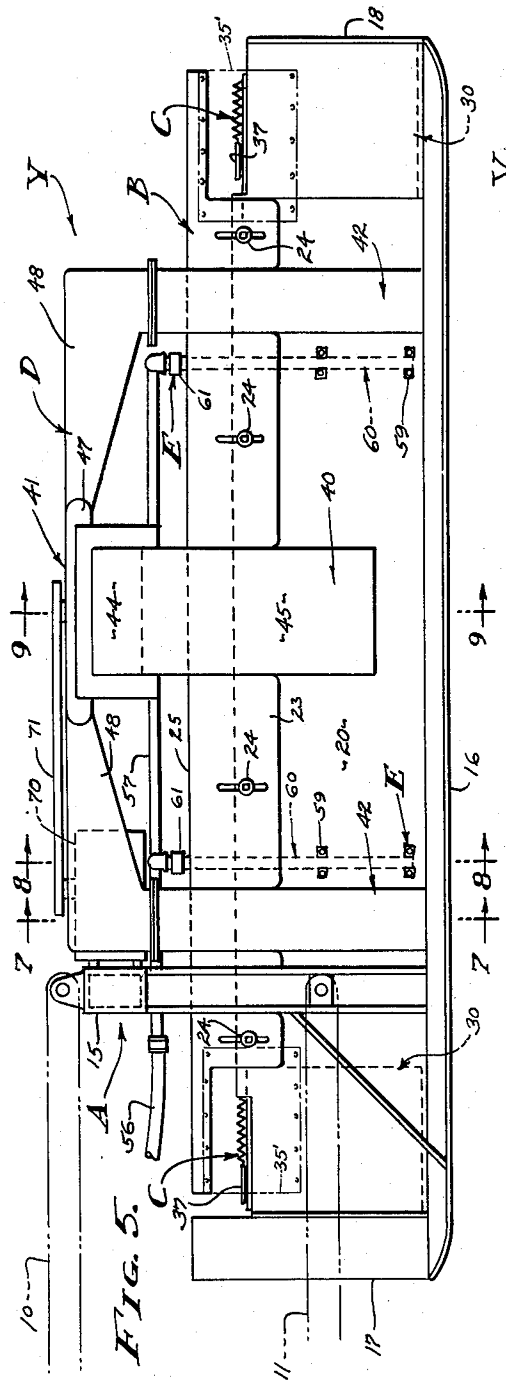

April 4, 1961 M. E. LINDSAY 2,977,715
CROP TREATING APPARATUS
Filed Dec. 1, 1958 3 Sheets-Sheet 1
FIG. 1.
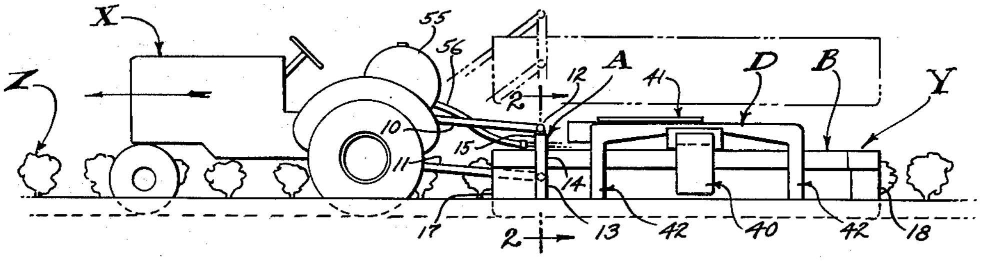
FIG. 2.
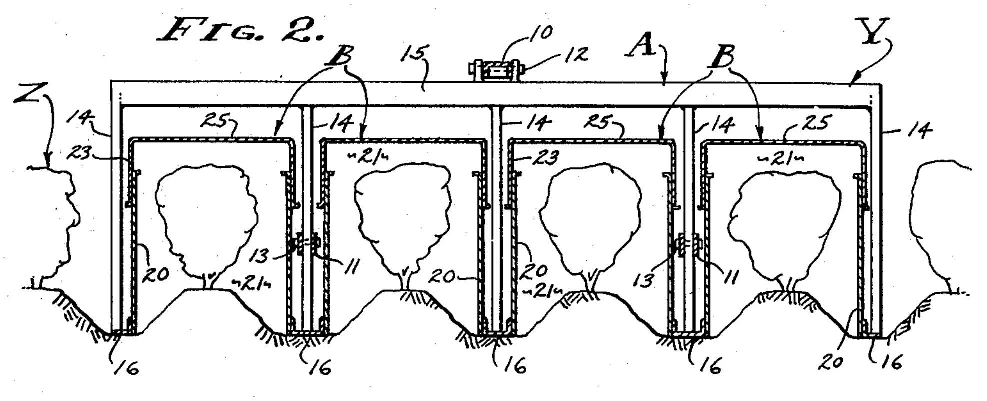
FIG. 3.
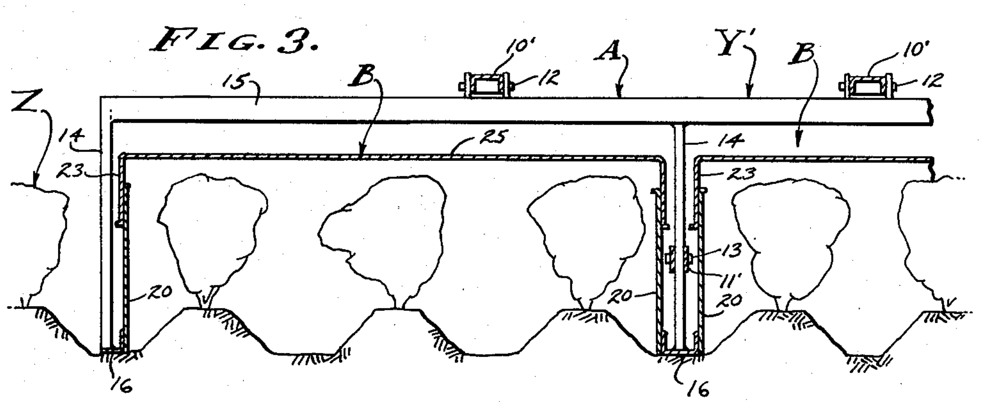
FIG. 4. FIG. 4a
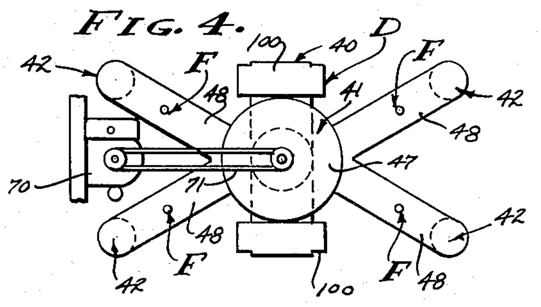
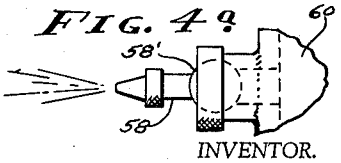
INVENTOR.
MAURICE E. LINDSAY
BY
W. H. Maxwell
AGENT

CROP TREATING APPARATUS

Filed Dec. 1, 1958

INVENTOR.
MAURICE E. LINDSAY

BY Wm. H. Maxwell
AGENT

April 4, 1961 M. E. LINDSAY 2,977,715
CROP TREATING APPARATUS
Filed Dec. 1, 1958 3 Sheets-Sheet 3

INVENTOR.
MAURICE E. LINDSAY
BY
Wm. H. Maxwell
AGENT

United States Patent Office 2,977,715
Patented Apr. 4, 1961

2,977,715

CROP TREATING APPARATUS

Maurice E. Lindsay, 3900 Fruitvale Ave.,
Bakersfield, Calif.

Filed Dec. 1, 1958, Ser. No. 777,367

16 Claims. (Cl. 47—1.7)

This invention relates to a crop treating apparatus and is particularly concerned with the treating of row crops with chemical treating materials, whether dry or wet, it being a general object of this invention to thoroughly treat the plants of row crops in a reliable and efficient manner.

Farming is done in rows of plants that are uniformly spaced both laterally and longitudinally of each other, and that are planted in uniformly graded soil. Proper treatment of extensive crops is usually costly and time consuming in that large quantities of chemical materials are needed. That is, the fumigating spray, mist, or dust, spread by land vehicles or by aircraft, as the case may be, requires substantial time and materials and the effectiveness thereof depends greatly upon the skill of application. In practice, too much or too little chemical materials can be applied and a great deal thereof is ordinarily wasted. For example, when treatment is carried out in the open, as in the usual case, fumigating fog, or spray, or dusting mixtures, are readily carried off or away by the wind, or said materials may simply evaporate and/or rise into the atmosphere or may simply precipitate to and be absorbed by the ground. In any case, large quantities of treating materials are ordinarily wasted or lost and are ineffective.

It is an object of this invention to confine chemical treating materials to the plants of a row crop so that they are not wasted and at the same time are, therefore, effectively employed.

An object of this invention is to circulate crop treating materials through a closed system so that all of the treating materials employed are effectively applied to the crop.

Another object of this invention is to provide a structure adapted to be advanced over or through a row crop and which confines chemical treating materials to an enclosure that houses the plants of the crop and which circulates and recirculates said materials to be effectively applied to the plants.

It is another object of this invention to provide a plant enclosing structure that is adapted to be advanced over or through a row crop and which involves means for accelerating a moving column of air laden with treating materials so that the mixture formed thereby is directed with increased velocity to impinge upon the plants of the row crop. Further, the foliage of the plants is agitated and the treating materials are applied from all directions to said foliage, that is, to both the tops and bottoms of the leaves.

It is still another object of this invention to provide a structure of the character thus far referred to that involves effective means for applying treating materials in the form of liquid spray to plants of a row crop. The structure provided is adjustable to vary the direction of application of the treating material, both horizontally and vertically.

It is still another object of this invention to provide a structure of the character thus far referred to that involves effective means for applying treating materials in the form of moisture to plants of a row crop by means of generating a fog or mist. The structure is provided with atomizing means, said means directing a mist through a closed system.

It is still another object of this invention to provide a structure of the character thus far referred to that involves effective means for applying powdered treating materials to the plants of a row crop. The structure is provided with dispensing means for powdered materials to be circulated through a closed system.

Also, it is an object of this invention to provide an air blowing and circulating means for carrying any one of the above mentioned treating materials and which recovers unapplied materials to recirculate them until they are applied to the plants of the crop.

Further, it is an object of this invention to provide a mobile enclosure for the plants of a row crop and wherein articulated closures are employed to seal the entry and exit openings of the enclosure.

Still further, it is an object of this invention to provide a crop treating apparatus of the character referred to that is adjustable in order to accommodate plants of varied size, and an apparatus that is adapted to be operated by a suitable draft vehicle, such as, for example, a tractor with suitable accessory handling devices for the operation of various elements of the apparatus, all as later described.

Figure 6:
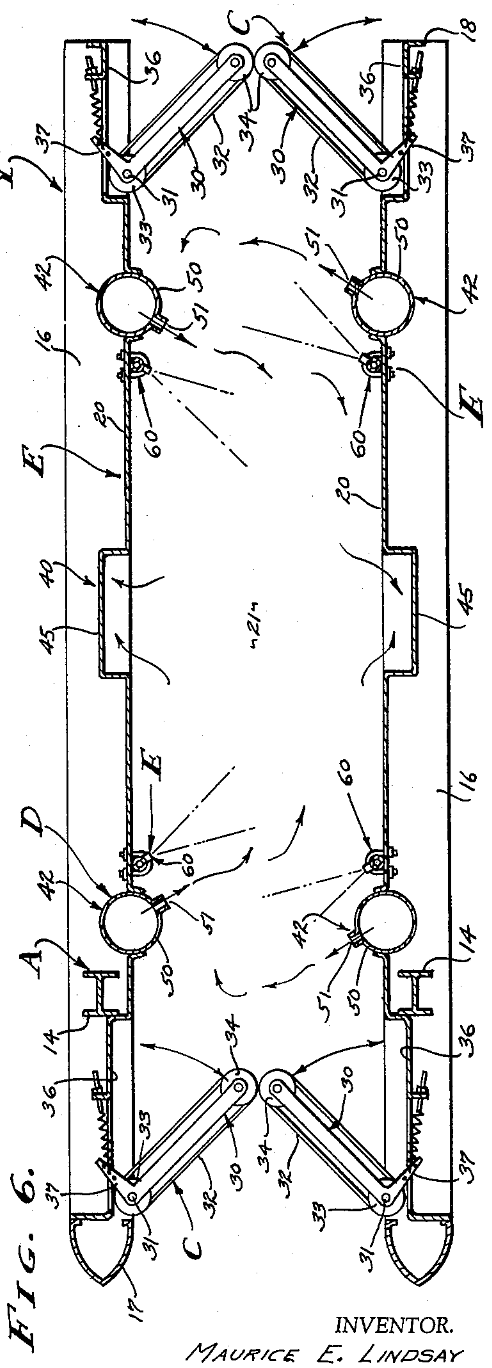
Figure 7:
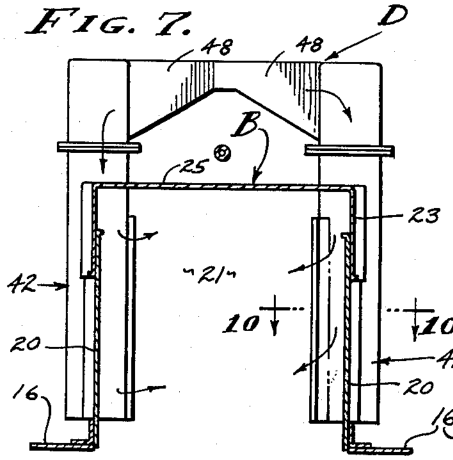
Figure 8:
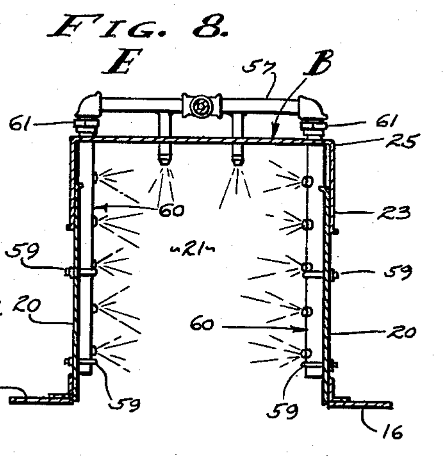
Figure 9:
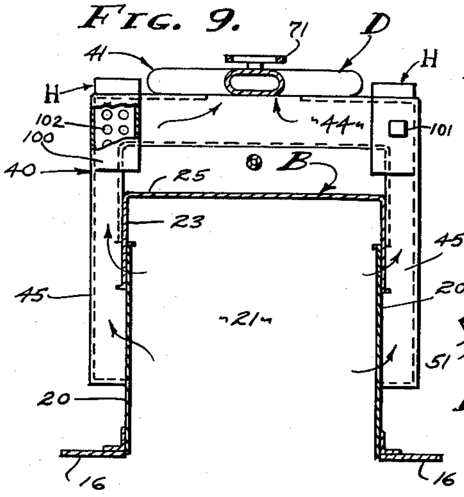
Figure 10:
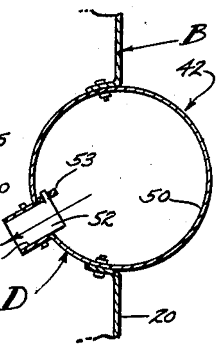
Figure 11:
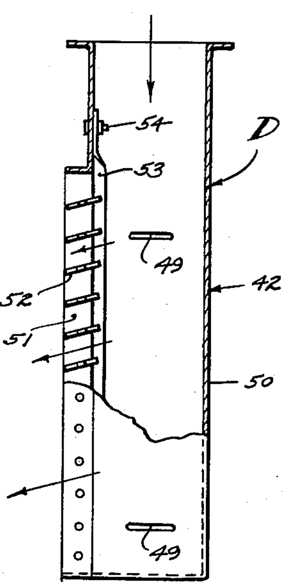
Figure 12:
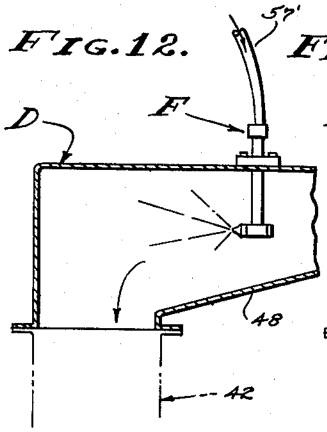
Figure 13:
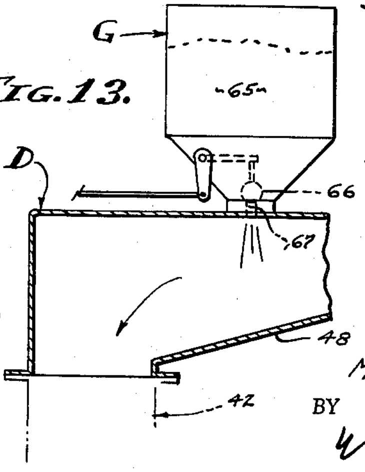

The various objects and features of my invention will be fully understood from the following detailed description of the typical preferred forms and applications thereof, throughout which description reference is made to the accompanying drawings in which:

Fig. 1 is a side elevation of the apparatus showing it in operation over a row crop of plants. Fig. 2 is a sectional view taken substantially as indicated by line 2—2 on Fig. 1. Fig. 3 is sectional similar to Fig. 2 and illustrates a modified form of the invention. Fig. 4 is a diagrammatic plan view of the top of the apparatus and illustrates the arrangement of the air circulating means. Fig. 4a is an enlarged detailed view of one of the liquid nozzles that I provide. Fig. 5 is an enlarged side elevation of the apparatus that I provide. Fig. 6 is a horizontal sectional view taken through the apparatus shown in Fig. 5. Figs. 7, 8 and 9 are sectional views taken substantially as indicated by lines 7—7, 8—8 and 9—9 on Fig. 5. Fig. 10 is an enlarged detailed sectional view taken as indicated by line 10—10 on Fig. 7. Fig. 11 is a vertical sectional view taken through the structure shown in Fig. 10. Fig. 12 is a view of a portion of the structure shown in Fig. 9 and showing one of the material dispensing means that I provide, and Fig. 13 is a view similar to Fig. 12 and showing another one of the material dispensing means that I provide.

The apparatus that I provide is for use in treating of plants with chemicals and it is adapted to be handled by a land vehicle to progress over or through a crop of plants. Farming is done in various manners, but generally involves preparation of the land in uniform furrows that run parallel with each other. Rows of plants are grown in the raised portions while the valleys therebetween are used for irrigating and for passage of draft vehicles and the like. In Fig. 1 of the drawings I have indicated a typical draft vehicle X of the type equipped with accessory operating mechanisms, and to which the apparatus Y that I provide is attached, to be operated over or through a row crop of plants Z.

The vehicle X is a tractor that is adapted to carry the apparatus Y and as the vehicle X moves over the crop Z the apparatus Y is drawn over or through the crop. The furrows are substantially straight and terminate at ends where the vehicle X must be turned 180° in order to move from one furrow or set of furrows to the next.

Therefore, vehicles or tractors X of the type under consideration are supplied with a lifting mechanism that is power operated and which involves upper and lower lifting arms 10 and 11. The said lifting mechanism is operated at the ends of the furrows to lift the apparatus from a normal operating position to a raised position, as indicated by phantom lines in Fig. 1 of the drawings. It will be apparent how the upward shifting of the arms 10 and 11 will raise the apparatus Y above the crop to the end that the vehicle can be turned.

The apparatus Y is a unit of construction for the treatment of row crops with chemicals and involves, generally, a frame A, one or more housings B, closures C for the housing or housings, air circulating means D, liquid spray means E, fog generating means F, and powder disseminating means G. The frame A may be considered as an element separate from the housing or housing B and is provided to be carried by the tractor arms 10 and 11 and to support the housing or housings. The housings B are alike and each is an elongate tunnel-shaped element adapted to engage over and pass through the row crop along the furrows thereof. The closures C are provided to shut off the ends of the tunnel-like housing A to establish a substantially closed chamber therein. The air circulating means D is provided to move a column of air, to accelerate and play said air upon the plants Z of the row crop and to recirculate said air again and again. The liquid spray means E, fog generating means F and powder disseminating means G are provided to dispense their respective materials into the column of air that is circulated by the means D, and said means E, F and G may be operated individually or simultaneously, all as circumstances require.

The frame A is preferably in the nature of an adapter, and therefore, may be considered separately from the housing or housings B. The usual vehicle X is of substantial width so that it is common practice to treat a plurality of rows of plants Z in one traverse over the crop. Therefore, the apparatus of the present invention is adapted to treat a plurality of individual rows of plants there being a plurality of housings B and related elements carried by the single frame A. As shown in Fig. 2 of the drawings there can be four separate housings B, one for each of the four rows of plants. Or, as indicated in Fig. 3, there can be two (or even one) housings B, each housing accommodating a plurality of rows of plants, for example, three rows of plants each. It will be readily apparent that the number of housings B carried by the frame A can vary as desired, and, further, the number of rows of plants Z accommodated by a single housing can also vary as desired.

The frame A is adapted to be carried by and to be shifted vertically by the tractor arms 10 and 11. Said arms 10 and 11 are commonly motivated through the tractor transmission in order to raise and to lower agricultural implements, said arms operating in unison and in substantial parallelism relative to each other. In practice, the lower arm 11 is usually powered while the upper arm 10 follows in a parallelogram motion. The two arms are of substantially the same length and they are individually connected to the frame A by means of vertically spaced pivot pins 12 and 13. The frame A involves spaced side members 14 and a header 15 extending between the side members. The pin 12 is secured through ears on the header 15 while the pins 13 are secured through lugs on the side members 14. In Fig. 2 there is shown a single upper arm 10 and a pair of lower arms 11, while in Fig. 3 there is shown a pair of upper arms 10' and a single lower arm 11'. As clearly shown, the side members 14 depend from the header 15 to join side rails 16 at each side of the housing B, there being a common side member 14 between adjacent housings B. Further, a brace 17 (see Fig. 5) reinforces the structure to the end that the rails 16 extend horizontally as they are raised and lowered by movement of the arms 10 and 11.

The housings B are alike and each is a horizontally and longitudinally disposed tunnel-like element having, generally, opposite side walls 20 and a top 25. The side walls 20 are carried by the rails 16, said rails being positioned to ride in spaced valleys and to each side of the row, or rows, of plants Z to be treated. The side walls 16 are flat vertically disposed parts terminating at the front end 17 and back end 18 of the housing so that there is an open passage 21 extending through the housing B. The top 25 extends between the top marginal edges 22 of the walls 14 and has opposite depending flanges 23 that overlie the upper portions of the two opposite walls 20. The top 25 is vertically adjustable and is joined to the side walls 20 through slotted connections 24, there being a screw fastener at each connection 24 so that the top 25 can be selectively positioned and then tightened in place. It will be apparent how the housing B is engaged over a row, or rows, of plants Z, and how it is then drawn through the crop by means of the vehicle X, and lifted in order to turn the vehicle at the ends of the rows of the crop.

In accordance with the invention I have provided the closure C for shutting off the ends of the tunnel-like housing B to form a closed chamber therein. As best illustrated in Figs. 5 and 6 of the drawings, the means C closes both the front and rear ends of the housing A and involves, generally, doors 30 that are yieldingly biased to swing closed. As shown, the doors 30 are provided in pairs, there being a pair of doors 30 at each end of the housing B. Each pair of doors 30 forms a closure C adapted to be opened by the passage of the plants Z into and out of the housing, as the case may be. That is, as the housing B is moved forwardly through the row crop the plants Z engage upon the doors 30 at the front of the housing causing them to open and to admit the plants into the chamber in the housing and to later engage upon the doors 30 at the rear of the housing causing them to open and to discharge the plants from the chamber in the housing. In the preferred form, the doors 30 are flat elements angularly related to each other, each door being pivoted on a vertical hinge 31 in the plane of the side wall 20. The hinges 31 are opposite each other while the doors 30 extend rearwardly and inwardly to closely approach or to engage each other at the center of the structure. As indicated, the doors are substantially coextensive with the height of the said walls 20, with a lower edge spaced above the rails 16 to at least partially clear the furrows, and with a top edge spaced down from the top 25 to allow vertical adjustment of the top.

Each door 30 has a movable panel 32 carried on spaced rollers 33 and 34. Since the apparatus is designed to move ahead or through a crop of plants, frictional engagement is reduced by providing doors with moving faces. That is, the face or panel 32 of each door moves with the plants Z, preferably upon frictional engagement therewith. It is to be understood that the rollers can be powered, if so desired, so that rearward motion of the panel 32 coincides with the forward speed of the apparatus through the crop. The rollers 33 and 34 are laterally spaced, the rollers 33 being rotatably carried on the centers of the hinges 31, and the rollers 34 being rotatably carried by a frame at the outer edge of the door. The panel 32 is a continuous loop of flexible material that is trained over the rollers 33 and 34 and which is soft and/or pliable to yield when engaged by the plants Z. There is a recess 36 provided in the side wall 20 to receive the door 30 when fully opened, and a lever 37 projects from each door 30 to be engaged with a spring acting to yieldingly close the door. As indicated in Fig. 5 a panel 35' of flexible material overlies the recess 36 at the outside of the housing B and allows for vertical adjustment of the top 25. The spring pressure is adjustable by providing a screw positioned by a nut so that the pressure exerted to close the doors 30 is readily variable. It will be apparent how the doors 30 yield to the passage of plants Z into and out of the chamber in the housing B, and how they yieldingly press against the plants Z, or upon each other, to close the chamber in the housing.

A feature of the present invention is the air circulating means D that moves a column of air through the chamber in the housing B. The said means D acts to drive the air into the housing and recirculates said air by again withdrawing it from the housing. That is, except for leakage, the same column of air is recirculated again and again through the housing. As shown, the means D involves, generally, an air receiver 40, an air drive means 41, and one or more air nozzles 42. The receiver 40 and nozzles 42 are associated with the housing B so that air is withdrawn from the housing and is then driven by the means 41 to be directed into the housing where it impinges upon the plants Z.

As best illustrated in Figs. 5, 6 and 9 of the drawings, the air receiver 40 is in the form of a manifold with a horizontal header 44 and depending extensions 45. The header 44 extends transverse of the housing B and is spaced above the top thereof while the extensions 45 lie adjacent the opposite side walls 20. The lower end portions of the extensions 45 open into the chamber within the housing B to receive air therefrom, as shown.

The air drive means 41 can vary widely as circumstances require and is best shown in Figs. 4 and 5 of the drawings. As indicated, the means 41 involves a blower 47, or the like, that is adapted to move a column of air and to increase the pressure thereof. In the particular form of the invention illustrated the air is withdrawn from the central portion of the housing B and is entered again into the housing at both end portions thereof. It is to be understood that the air column can be withdrawn at one end of the housing B and entered again into the housing at the other end thereof. In the case illustrated, the blower 47 draws air from the center of the header 44, intermediate the extensions 45 and delivers air under increased pressure through ducts 48. As later described, there is a pair of air nozzles 42 at each end of the housing A in which case there is at least one duct 48 extending forwardly and at least one duct 48 extending rearwardly from the blower 47. In practice, since the nozzles 42 are laterally spaced, as shown, the ducts 48 are branched, there being a pair of diverging ducts 48 extending to the pairs of spaced nozzles 42. The ducts 48 are horizontally disposed and extend from the delivery portion of the blower 47.

As best illustrated in Figs. 5, 6 and 7 of the drawings, the air nozzles are related to direct the flow of air into the chamber within the housing B at both the forward and rear portions thereof. As stated above, the nozzles 42 are provided in pairs with one nozzle at each side of the housing. The nozzles 42 are vertically disposed and are formed to direct air laterally and inwardly to impinge upon the plants Z. As shown in detail in Figs. 10 and 11, the nozzle itself involves a vertical tubular body 50 with a vertical slot-shaped opening 51 extending along the inner side thereof. The body 50 is closed at its lower end and is round in cross section so that it can be turned and faced as desired. Slotted openings 49 are provided in the walls of the nozzle to allow for adjustment and to receive screw fasteners for securing the nozzles 42 in the selected position. Further, air directing means, preferably a plurality of spaced louvers 52, or the like, are employed in the opening 51 and are rotatably adjustable on horizontal axes to direct the air along the desired angle of inclination. A single adjusting bar 53 is anchored by a screw fastener 54 to position the louvers 52. It will be apparent how a column of air is circulated through the chamber within the housing B, preferably from both ends and towards the center thereof, to be directed laterally inward to impinge upon the plant foliage at increased velocity and to then be withdrawn from the chamber, etc.

As best illustrated in Figs. 6 and 8 the liquid spray means E is provided to dispense liquid chemical materials into the column of air moved by the means D and in a manner to impinge upon the foliage of the plants Z. As shown in Fig. 6 the means D and E operate seperately from each other, the air circulating means D moving the column of air that is circulated throughout the chamber and the means E dispensing liquid material onto the plants Z. In carrying out the invention, the tractor X carries a reservoir 55 and power is taken from the tractor to operate a pump for delivering liquid under suitable pressure throughout a supply hose 56. The hose 56 delivers liquid to piping 57 that branches to the several spray bars 60 that I provide.

The spray bars 60 can be positioned in various manners and are located at the opposite side walls of the housing B. As shown, the bars 60 are elongate with a plurality of nozzles 58 arranged in a vertically disposed series. That is, bars 60 are vertically disposed, and the nozzles 58 are faced inwardly to direct liquid spray onto the plants Z. The force of impingement is controlled by the pressure supplied. As shown in Fig. 6, I prefer to employ a spray bar 60 at each air nozzle 42, and in practice the spray bars 60 can be mounted adjacent to said nozzles 42. In order to adjust the direction of spray the bars are rotatably mounted by means of U-bolts 59 and they are coupled to the piping 57 by means of unions 61. Further, and as shown in Fig. 4*a*, the individual nozzles 58 are swivelly mounted, as by a ball-joint connection 58′, so that the spray can be projected in any direction, i.e. up and down and laterally. It will be readily apparent how the U-bolts 59 are loosened in order to turn the bars 60 into the desired rotative position.

As best illustrated in Figs. 4 and 12 of the drawings, the fog generating means F is provided to dispense moisture laden with chemical materials into the column of air moved by the means D and in a manner to disperse and thereby mix with the entire column of moving air. The means F can be supplied with liquid chemical materials the same as the means E above described, through piping 57′. In practice the liquid dispensed into the column of air at most any point, it being preferred to introduce said liquid into the ducts 48 that lead to the air nozzles 42. Thus, there are separate means F one for each air nozzle 42, and each involves a jet 63 adapted to dispense said liquid in a mist form to be carried by the moving column of air (see Fig. 4). The mist formed by the jets 63 quickly disperses into the air column and is carried through the chamber to wet the foliage of the plants Z.

As best illustrated in Fig. 13 of the drawings, the means F above described can be supplemented or replaced by a powder disseminating means G that is provided to dispense dry chemical materials into the means D and in a manner to mix with the entire column of air being moved. As shown, the means G involves a supply bin 65 that carries a store of powdered materials and a valve 66 adapted to pass said material into the column of moving air. I have shown the means G positioned the same as the means F above described and so that the powdered material is entered into the ducts 48. The bin 65 overlies the valve 66 so that the powdered material flows by gravity through the valve and into the duct 48. The valve 66 is shown as a ball valve operated by a lever system and opening a port 67 communicating with the interior of the duct 48. It will be readily apparent how the powdered material enters into the duct to mix with the column of moving air and forms a mixture of dust that will adhere to the foliage of the plants Z in the usual manner.

In addition to the foregoing means I also provide an air conditioning means H for tempering the air column that is circulated through the structure. As best illustrated in Fig. 9 one or more heaters, or coolers, 100, is placed in the air circulating means D to temper the air handled thereby. In the particular case illustrated, the means H is a heater 100, one in each extension 45, and with a burner 101 and with heat transfer tubes, or flues 102, to heat the air before it enters the header 44. With the heaters 100, as shown, the temperature of circulated air can be increased, or when a cooler is employed it can be decreased.

From the foregoing, the structural relationship of the elements involved and the operation thereof will be readily apparent. As the vehicle X traverses a crop it follows the furrows and draws the apparatus Y over or through the rows of plants Z. As shown in Fig. 1, the rails 16 have sliding and supporting sealed engagement with the ground at the valleys between the rows, the entire apparatus being adapted to be lifted in order to turn the vehicle at the ends of the rows. As the apparatus Y is advanced along the rows of plants Z the closures C at the front and rear of the housing B yield to allow entering of and exiting of the plants Z into and out of the housing, while maintaining a substantially effective seal at the front and rear of the housing. During operation of the apparatus the blower 57 is operated, as by means of a prime mover 70, for example, a small internal combustion engine and a belt drive 71, to circulate the air in a column that moves through the chamber. Substantial force can be employed in moving said air column by compressing it with the blower 57 and by discharging it through the nozzles 42. The air discharge by the nozzles impinges upon the foliage of the plants Z with substantial velocity and agitation thereof and to the end that all sides and faces of the leaves and branches receive the impact of accelerated air. However, if a tender crop is encountered and which will not stand severe agitation, then the blower 57 is accordingly operated at lower speeds, and in some instances the blower can be operated at very low speeds in order to barely agitate the foliage of the crop being treated. Further, there may be instances where the crop is so tender that air circulation is not advisable and such that fumigation or spraying can be accomplished without operation of the blower, and in this instance the housing B that I provide confines the mist, spray, or powders to the plants with a minimum of loss thereof.

The apparatus is shown carried and handled by a draft vehicle X, said vehicle supplying the required support for traction and for lifting and turning at the ends of the crop rows. It is to be understood, however, that the apparatus Y per se may be provided with its own vehicle means, if so desired, including powered traction means and power for the various elements involved, all as hereinabove described.

In accordance with the invention the apparatus deposits chemical treating materials upon the foliage and branches of the plants Z, either dry materials or liquid materials. It is sometimes required that chemicals be applied in a solid stream of liquid as by spraying, in which case the spray means E is put into operation. In other instances the chemical to be applied is most effective when in the form of a mist, in which case the fog means F is put into operation. Further, powdered chemical preparations require dusting, in which case the disseminating means G is put into operation. It is to be understood that any one or all of the above mentioned dispensing means may be employed singly or in combination together, depending upon the characteristics and compatibility of the materials to be applied.

With the apparatus in operation as above described, the chemical materials are played onto and impinge upon all parts of the plants Z. Also, materials that are not applied to the plants when first introduced into the chamber are withdrawn and recirculated and are redirected, over and over again if necessary, until deposited upon the plants. By selecting the speed of advancement over or through the crop Z and by controlling the rapidity of air circulation, the desired exposure is readily obtained, the length of the housing B being a controlling factor. Further, the proper application of chemical materials is facilitated by tempering the circulated air to the most desirable condition for said application. Since the circulation system is a closed system very little material is lost, to the end that the apparatus is most efficient in its operation and application of the treating materials handled thereby.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An apparatus for the treatment of the plants of row crops and including, a movable housing engageable over the crop and with open ends for receiving and discharging plants as the housing is advanced through the crop, air circulating means to withdraw air from the central portion of the housing and to project air into the end portion of the housing to move in columns through and to the said central portion thereof, and material dispensing means discharging into the air circulating means to enter a crop treating material into the said column of air.

2. An apparatus for the treatment of the plants of row crops and including, a movable housing engageable over the crop and with open ends for receiving and discharging plants as the housing is advanced through the crop, air circulating means to move a column of air through the housing, an air nozzle within the housing and in communication with said air circulating means and directing air to impinge upon plants within the housing, and material dispensing means discharging into the circulating means to enter a crop treating material into the said column of air.

3. An apparatus for the treatment of the plants of row crops and including, a movable housing engageable over the crop and with open ends for receiving and discharging plants as the housing is advanced through the crop, air circulating means to move a column of air through the housing, air nozzles within and at opposite sides of the housing and in communication with said air circulating means and directing air to impinge upon plants within the housing, and material dispensing means discharging into the air circulating means to enter a crop treating material into the said column of air.

4. An apparatus for the treatment of the plants of row crops and including, a movable housing engageable over the crop and with open ends for receiving and discharging plants as the housing is advanced through the crop, air circulating means to move a column of air through the housing, a manifold to receive air from the center portion of the housing and in communication with said air circulating means, and at least one air nozzle within the housing and in communication with said air circulating means and directing air to impinge upon plants within the housing, and material dispensing means discharging into the air circulating means to enter a crop treating material into the said column of air.

5. An apparatus for the treatment of the plants of row crops and including, a movable housing engageable over the crop and with open ends for receiving and discharging plants as the housing is advanced through the crop, air circulating means to move a column of air through the housing, a manifold opening into the housing to receive air from the central portion thereof and in communication with said air circulating means, and at least one air nozzle within each end portion of the housing and in communication with said air circulating means and directing air to impinge upon plants within the housing, and material dispensing means discharging into the air circulating means to enter a crop treating material into the said column of air.

6. An apparatus for the treatment of the plants of row crops and including, a movable housing engageable over the crop and with open ends for receiving and discharging plants as the housing is advanced through the crop, air circulating means to move a column of air through the housing, a manifold opening into the housing to receive air from the central portion thereof and in communication with said air circulating means, a pair of air nozzles within each end portion of the housing and in communication with said air circulating means and directing air to impinge upon plants within the housing, and material dispensing means discharging into the air circulating means to enter a crop treating material into the said column of air.

7. An apparatus for the treatment of the plants of row crops and including, a movable housing engageable over the crop and with open ends for receiving and discharging plants as the housing is advanced through the crop, air circulating means to withdraw air from the central portion of the housing and to move a column of air and project it through the housing and toward the central portion thereof, and liquid dispensing means independent of the air circulating means and comprising a liquid pressure supply and at least one liquid nozzle to play liquid treating material onto the plants within the housing and into said column of air.

8. An apparatus for the treatment of the plants of row crops and including, a movable housing engageable over the crop and with open ends for receiving and discharging plants as the housing is advanced through the crop, air circulating means to withdraw air from the central portion of the housing and to move a column of air and project it through the housing and toward the central portion thereof, and liquid dispensing means independent of the air circulating means and comprising a liquid pressure supply and a spray nozzle within and at each side of the housing to play liquid laterally and inwardly and onto the plants within the housing and into said column of air.

9. An apparatus for the treatment of the plants of row crops and including, a movable housing engageable over the crop and with open ends for receiving and discharging plants as the housing is advanced through the crop, air circulating means to move a column of air through the housing, an air nozzle in communication with said means and directing air to impinge upon plants within the housing, and liquid dispensing means comprising a liquid pressure supply and a liquid nozzle adjacent the said air nozzle to play liquid treating material onto the plants and into said column of air.

10. An apparatus for the treatment of the plants of row crops and including, a movable housing engageable over the crop and with open ends for receiving and discharging plants as the housing is advanced through the crop, air circulating means to move a column of air through the housing, air nozzles at opposite sides of the housing and in communication with said means and directing air to impinge upon plants within the housing, and liquid dispensing means comprising a liquid pressure supply and a spray bar adjacent the said air nozzles, each of said spray bars having a plurality of nozzles to play liquid treating material onto the plants and onto said column of air.

11. An apparatus for the treatment of the plants of row crops and including, a movable housing engageable over the crop and with open ends for receiving and discharging plants as the housing is advanced through the crop, air circulating means to withdraw air from the central portion of the housing and to move a column of air and project it through the housing and toward the central portion thereof, and liquid dispensing means independent of the air circulating means and comprising a liquid pressure supply and fog jet projected into the air circulating means to enter said liquid into said column of air.

12. An apparatus for the treatment of the plants of row crops and including, a movable housing engageable over the crop and with open ends for receiving and discharging plants as the housing is advanced through the crop, air circulating means to move a column of air through the housing and comprising an air blower and a duct handling air therefrom to deliver it into the housing, and liquid dispensing means comprising a liquid pressure supply and fog jet to enter said liquid into said column of air in the duct.

13. An apparatus for the treatment of the plants of row crops and including, a movable housing engageable over the crop and with open ends for receiving and discharging plants as the housing is advanced through the crop, closures carried at the said open ends of the housing and normally closed and adapted to open when engaged by and to pass the plants into and out of the housing, air circulating means to withdraw air from the central portion of the housing and to move a column of air and to project it through the housing and to the said central portion thereof, and material dispensing means discharging into the air circulating means to enter a crop treating material into the said column of air.

14. An apparatus for the treatment of the plants of row crops and including, a movable housing engageable over the crop and with open ends for receiving and discharging plants as the housing is advanced through the crop, shiftable closures carried at the said open ends of the housing and with movable faces normally closed and adapted to open when engaged by and to pass the plants into and out of the housing, air circulating means to withdraw air from the central portion of the housing and to move a column of air and to project it through the housing and to the said central portion of the housing, and material dispensing means discharging into the air circulating means to enter a crop treating material into the said column of air.

15. An apparatus for the treatment of the plants of row crops and including, a movable housing engageable over the crop and with open ends for receiving and discharging plants as the housing is advanced through the crop, air circulating means to move a column of air through the housing, and an independent air temperating means discharging into the air circulating means to condition the column of air circulated thereby.

16. An apparatus for the treatment of the plants of row crops and including, a movable housing engageable over the crop and with open ends for receiving and discharging plants as the housing is advanced through the crop, air circulating means to move a column of air through the housing, and an independent air tempering means discharging into the air circulating means to condition the column of air circulated thereby, and material dispensing means discharging into the air circulating means to enter a crop treating material into the said column of air circulated thereby.

References Cited in the file of this patent

UNITED STATES PATENTS

| | | |
|---|---|---|
| 827,174 | Patterson | July 31, 1906 |
| 1,465,557 | Oldham | Aug. 21, 1923 |
| 1,669,435 | Wheeler | May 15, 1928 |
| 2,286,888 | Arnold | June 16, 1942 |

FOREIGN PATENTS

| | | |
|---|---|---|
| 601,168 | Great Britain | Apr. 19, 1948 |
| 623,233 | Great Britain | May 13, 1949 |